United States Patent [19]
Kerklaan et al.

[11] Patent Number: 5,861,968
[45] Date of Patent: Jan. 19, 1999

[54] INFRARED TRANSCEIVER FOR AN APPLICATION INTERFACE CARD

[75] Inventors: Albert J. Kerklaan; John V. Taglione, both of Scarborough, Canada

[73] Assignee: International Business Machines Corporation, Armonk, N.Y.

[21] Appl. No.: 708,433

[22] Filed: Sep. 5, 1996

[30] Foreign Application Priority Data

Dec. 29, 1995 [CA] Canada .................................. 2166357

[51] Int. Cl.⁶ .................................................. G06F 13/00
[52] U.S. Cl. ........................ 359/152; 359/118; 359/159; 395/500; 395/882; 395/885
[58] Field of Search .................... 359/118, 142, 359/143, 147, 148, 152, 159, 172; 395/500, 882, 885

[56] References Cited

U.S. PATENT DOCUMENTS

| | | | |
|---|---|---|---|
| 4,727,600 | 2/1988 | Avakian | 359/165 |
| 5,343,319 | 8/1994 | Moore | 359/152 |
| 5,440,449 | 8/1995 | Scheer | 361/686 |
| 5,564,020 | 10/1996 | Rossi | 359/118 |
| 5,600,471 | 2/1997 | Hirohashi et al. | 359/152 |
| 5,619,396 | 4/1997 | Gee et al. | 361/686 |
| 5,668,383 | 9/1997 | Krieger | 257/80 |
| 5,734,487 | 3/1998 | Rossi | 359/145 |
| 5,736,782 | 4/1998 | Schairer | 257/679 |

*Primary Examiner*—Edward Lefkowitz
*Attorney, Agent, or Firm*—John D. Flynn; Winstead, Sechrest & Minick

[57] ABSTRACT

An infrared transceiver for an application interface card for use with a computer in a wireless Local Area Network. The transceiver includes a multi-facet beam deflector to maximize dispersion of the infrared beams in a room while maintaining a compact arrangement for the interface card. In another aspect, the transceiver includes a revolving turret to provide directional capabilities for serial IR or point-to-point communication applications. The transceiver is suitable for PCMCIA interface cards.

4 Claims, 7 Drawing Sheets

INFRARED TRANSCEIVER FOR AN APPLICATION INTERFACE CARD

FIELD OF THE INVENTION

The present invention relates to wireless communication systems, and more particularly to an optical transmitter and receiver arrangement for an application interface card such as used in notebook and laptop computers.

BACKGROUND OF THE INVENTION

Local area networks (LANs) are prevalent in computing, and the connection of computers in a LAN provides a convenient vehicle for distributed processing and efficient allocation of resources, such as servers, printers, scanners, and gateway communication devices. In the office environment, LANs typically comprise wired interconnections between stations or computers. Wired LANs have the disadvantage that extensive cabling is required to interconnect the stations in the network. The installation of such cabling is generally inconvenient and gives rise to inflexibility if it is desired to alter the physical locations of the stations comprising the network.

To overcome the disadvantages of wired LANs, it has been proposed to utilize a wireless transmission link to replace the cabling connections of a wired LAN. Wireless communication between two points is well known and two approaches have emerged as solutions for wireless LANs. One solution uses radio frequency (RF) communication techniques to implement the communication channels. The other solution utilizes infrared (IR) radiation as a communication medium. Infrared based systems have found widespread appeal, particularly in an indoor environment, such as an office building. Infrared based systems have the additional advantage of not requiring compliance with the more stringent government regulations applied to RF based systems, for example, as would be required for a system utilizing microwave frequency signals.

Communication interconnections in a wireless LAN utilizing infrared are set up using infrared transceivers. A station, e.g. personal computer (PC), is connected to a transceiver. The transceiver has an infrared transmitter and an infrared receiver. The infrared transmitter includes at least one infrared light emitting diode (LED), and typically comprises an array of infrared LEDs. The infrared receiver comprises one or more photodiodes responsive to the output wavelength spectrum of the LED in the transceiver of the communication station on the LAN.

In the art, infrared-based transceivers fall into two general classes: diffused IR transceivers and directed beam IR transceivers. Diffused IR transceivers typically comprise an array of LEDs which disperse infrared beams throughout an office space. The infrared beams are picked up by the receivers of transceivers on stations located throughout the office. Diffused IR transceivers permit a data processing station, i.e. computer, to talk with a number of other stations located in the office space. In directed beam IR transceivers, the infrared beam is directed towards the transceiver of the station intended for communication. In other words, there is a line of sight path between two stations and the infrared beam is directed along this line of sight path. Direct beam IR transceivers are commonly referred to as "point and shoot" or "serial IR" systems, and find widespread use in establishing a communication link between a computer and peripheral device, for example, a notebook computer and a laser printer.

The performance and integrity of an infrared communication link will depend on the operating environment, particularly the ambient light and the reflectivity of the interior surfaces. Infrared systems tend to provide better performance in an office space where the ambient light level is not very high, especially, in systems where the carrier beam is not high frequency modulated. The reflectivity of the interior surfaces of an office space will also affect transmission of infrared beams. Surfaces having a tendency to absorb infrared beams will degrade the performance of an infrared communication system, and in particular a system comprising diffused beam devices. It is possible to lessen the effects of the operating environment using set-up techniques for the infrared transceivers and adjustments to the orientations of the beam paths.

The development of reduced size laptop, notebook computers and handheld computing devices has necessitated the concurrent development of modems and network adapters of suitable size to fit within the housings of these computers to provide the capability for connection to LANs.

This trend has led to the development of PCMCIA (Personal Computer Memory Card International Association) cards to house the interface circuits. PCMCIA cards are also known as PC cards in the industry. These cards are inserted into slots provided in the computer housing and provide an interface between the external communication line and the computer. The PC cards come in two standard sizes. Type I PC cards are 3.3 mm thick, and Type II cards are 5 mm thick.

With the development of wireless LANs there is a need to provide an infrared optical transceiver for a PCMCIA application interface card for use with laptop and notebook computers and handheld computing devices.

BRIEF SUMMARY OF THE INVENTION

The present invention provides an infrared transceiver suitable for a PCMCIA application interface card. In one embodiment, the present invention provides an application card infrared transceiver of the diffused IR type where the emitted beams are dispersed in the operating space. In another embodiment, the present invention provides an application card infrared transceiver of the directed beam type where the emitted beams are directed along a predetermined path or sight line to the transceiver of the receiving device.

In a first aspect, the present invention provides an application interface card for providing a wireless communication interface for a computer, the interface card comprising: a card housing; a plurality of light emitting diodes located on an extension portion of the card housing; circuit means for operating the light emitting diodes, the circuit means including interface means for receiving signals from the computer; reflecting means positioned at the emitting ends of the light emitting diodes for deflecting the beams emitted by the light emitting diodes in controlled directions to produce a predetermined beam dispersal pattern.

The beam deflector according to the invention comprises multiple compound angle surfaces. The angled surfaces are arranged to deflect each beam into a different portion of a hemispherical dispersion pattern. The angled surfaces are formed from a highly reflective material such as chrome plated plastic or the like. The arrangement according to the present invention provides improved dispersion of the infrared LED beams while maintaining a compact design making the transceiver suitable for a PCMCIA type card.

In a second aspect, the present invention provides an application interface card for providing a wireless communication interface for a computer, the interface card comprising: a card housing having a longitudinal member adapted for fitting into a slot on the computer; at least one light emitting diode; the card housing including a platform at an external end of the longitudinal member and the platform including a rotatable turret and means for mounting the light emitting diode on the turret; circuit means for operating the light emitting diode, the circuit means including interface means for receiving signals from the computer; the turret being rotatable for changing the direction of the beam emitted from the light emitting diode to provide a point-to-point path for the beam without changing the position of the computer holding said card.

The turret arrangement according to the present invention allows the computer user to direct the beam to the transceiver of the receiving device without changing the position or orientation of the computer.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
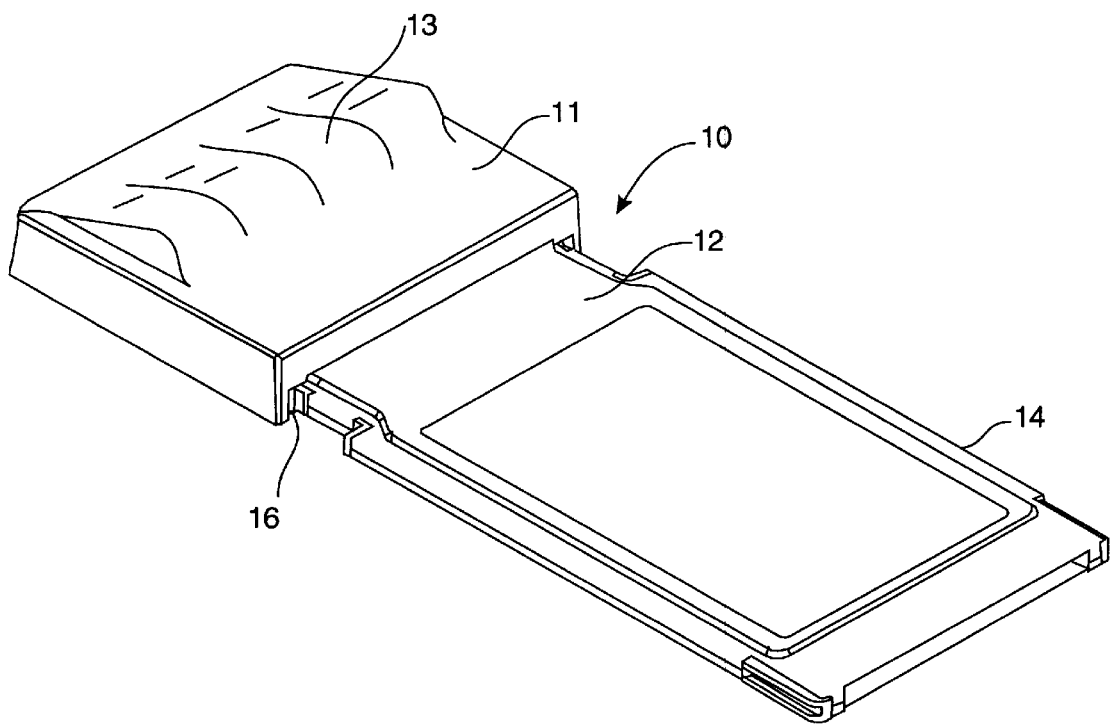
FIG. 1 is a perspective view of an application interface card for an infrared transceiver according to the present invention.

Reference is first made to FIG. 1 which shows an application interface card according to the present invention and indicated generally by 10. Like numerals indicate like elements in the figures. The application card 10 comprises a housing 12 which is made with a longitudinal member 14. The housing 12 includes a compartment for holding electronic circuitry. The longitudinal member 14 is dimensioned to fit inside a suitable slot 2 in a computer 1 shown in a partial cross-sectional view in FIG. 4(b). For example, a Type I PCMCIA card is 3.3 mm thick, and a Type II PCMCIA card is 5 mm thick.

Figure 2:
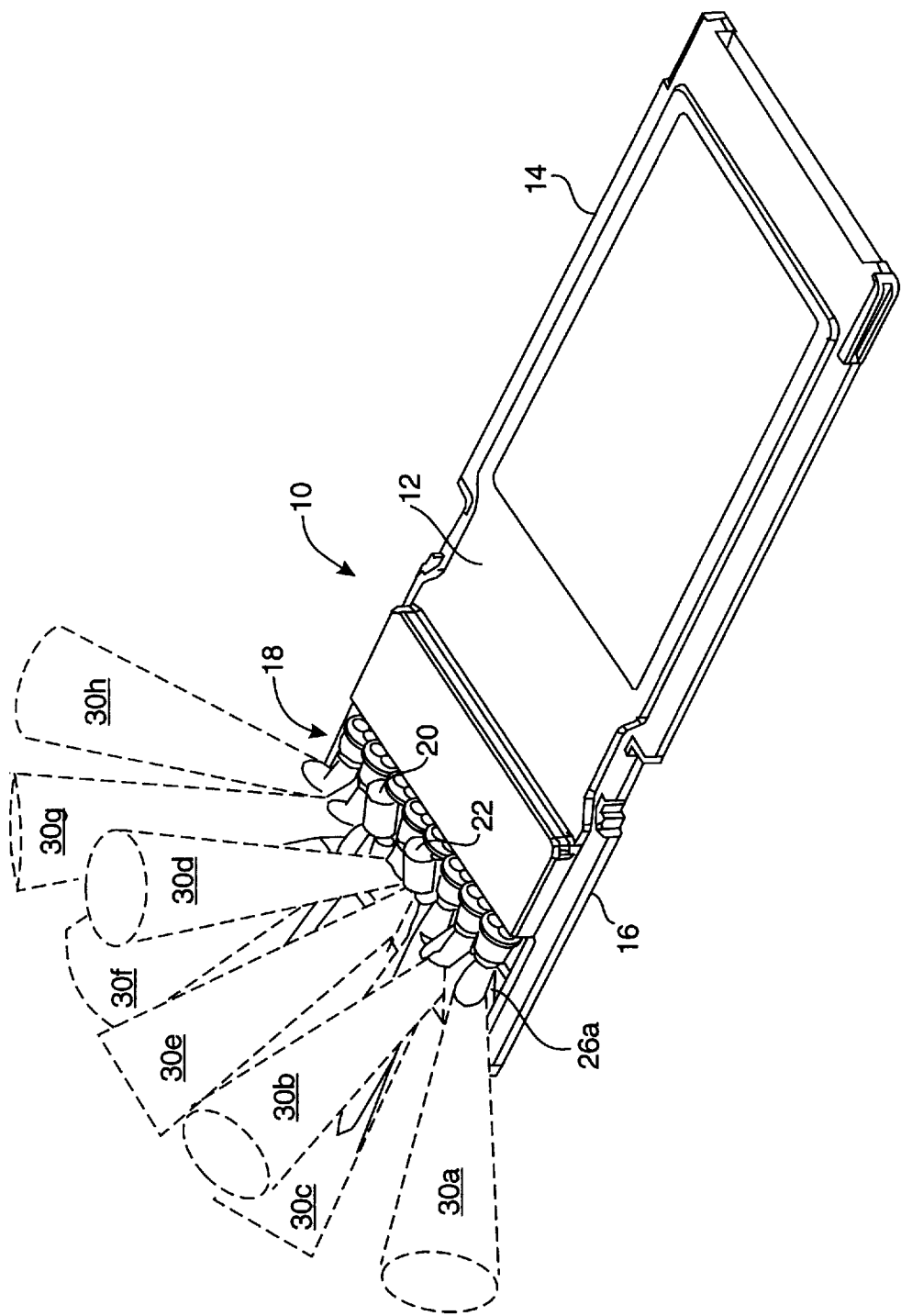
FIG. 2 is a perspective view of the infrared transceiver of FIG. 1 with the lens cover removed.
Figure 3:
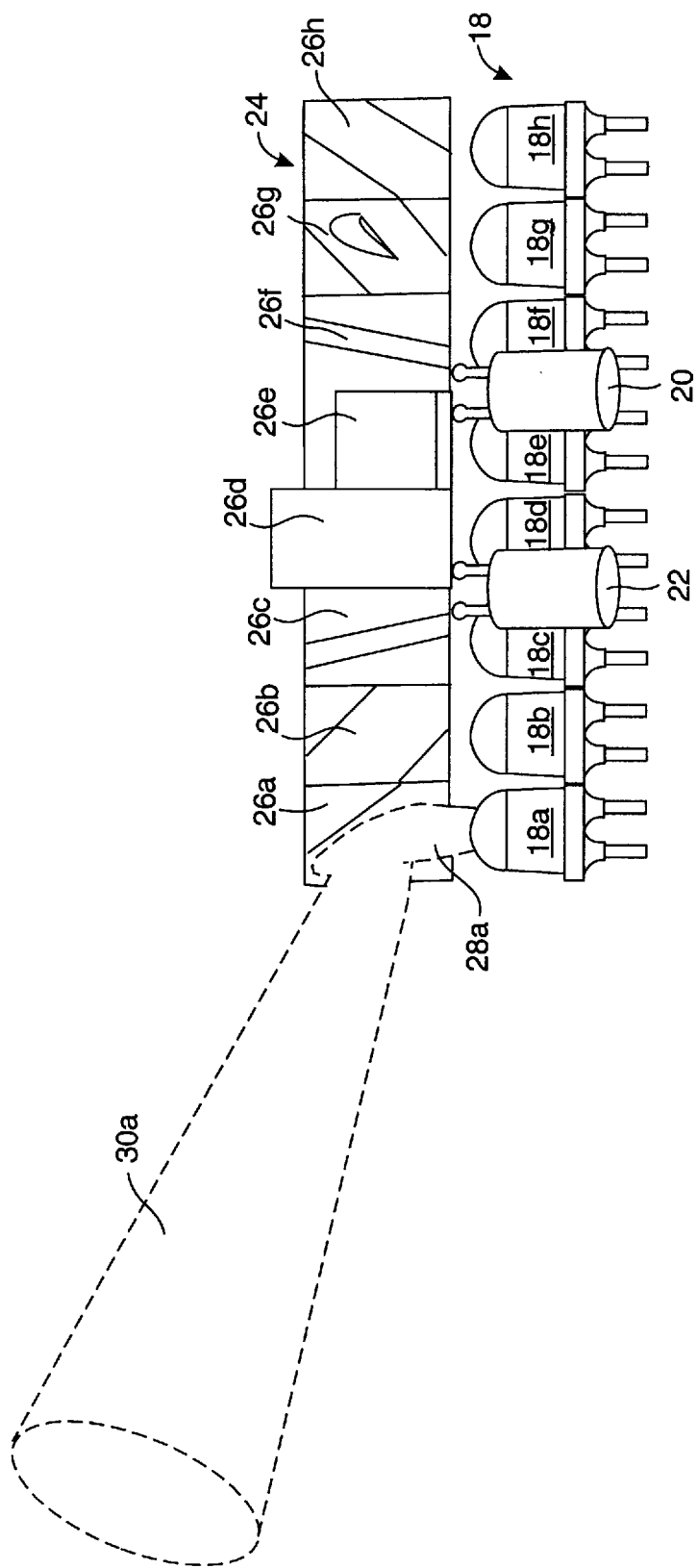
FIG. 3 is a top view of the LED and photodiode array and multi-facet beam deflector embodied in the infrared transceiver according to the present invention.
Figure 4A:
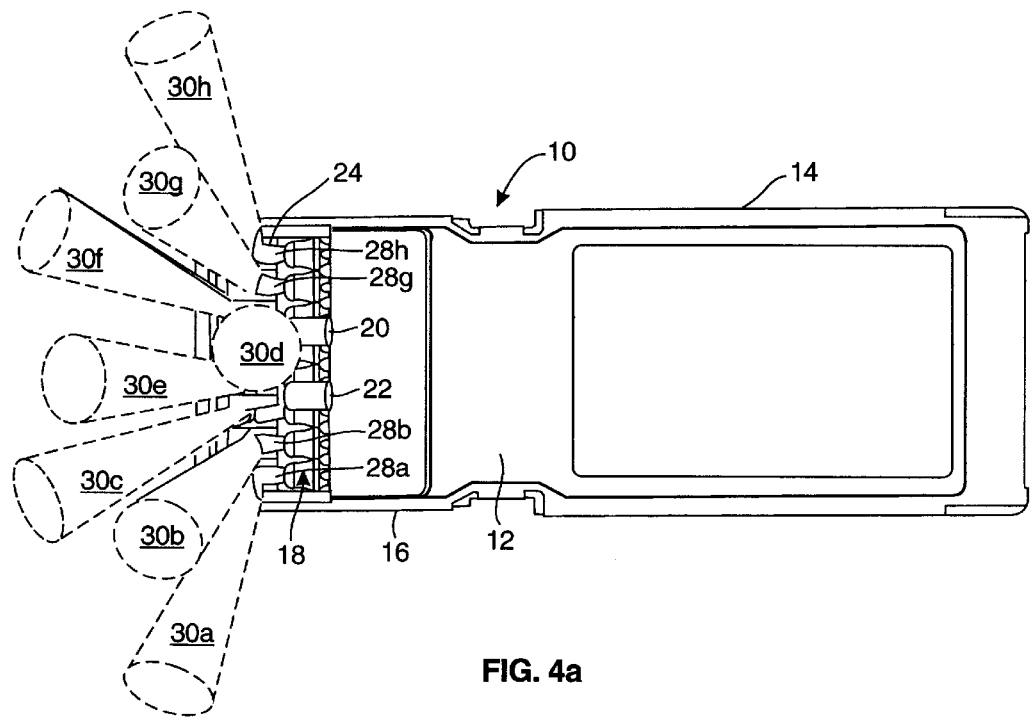
FIG. 4(a) is a top view of the infrared transceiver of FIG. 1 showing the distribution of the beams reflected by the multi-facet beam deflector according to the present invention.
Figure 4B:
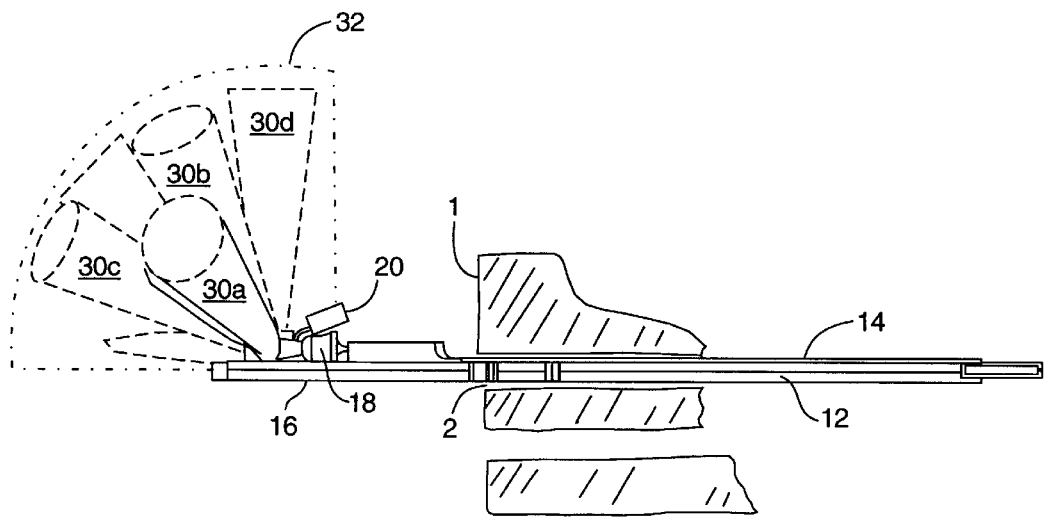
FIG. 4(b) is a side view of the distribution of the beams of FIG. 4(a)

As shown in FIG. 2, the application card 10 includes an external platform 16. The external platform 16 extends from the computer 1 when the card 10 is fully inserted in the slot 2. The platform 16 provides the substrate for mounting an array of light emitting diodes 18 and photodiodes 20, 22. As shown in FIG. 3, the array 18 comprises eight light emitting diodes, shown individually as 18a to 18h. The diodes 18 are mounted in a horizontal plane which is substantially parallel to the longitudinal member 14 as shown in FIG. 4(b). As also shown in FIG. 4(b), the photodiodes 20 (and 22) are mounted at an angle of approximately 25° to horizontal.

Referring to FIG. 3, the application card 10 includes a multi-facet beam deflector 24. The beam deflector 24 is mounted on the platform 16 adjacent the emitting ends of the LEDs 18. The beam deflector 24 comprises a series of compound angle surfaces indicated generally as 26a to 26h. The compound angle surfaces are arranged to deflect the beams from the LEDs at predetermined angles. The surfaces 26 are preferably formed or coated with a highly reflective material, such chrome plated plastic, to provide optimal deflection of the beams. For example, LED 18a emits a beam 28a shown in broken outline in FIG. 3. The beam 28a hits the compound angle surfaces 26a and is deflected as beam 30a. Similarly, the other compound angle surfaces 26b to 26h are arranged to produce respective deflected beams 30b to 30h as shown in FIGS. 2 and 4. According to this aspect of the invention, the beams 28 are deflected to produce a half hemispherical dispersion pattern 32 as illustrated in FIG. 4(b) using a broken chain outline. The dispersion pattern 32 maximizes the beam coverage in a room for the physical arrangement of a PCMCIA type card plugged into the slot 2 of a notebook 1 resting on a flat surface, e.g. a desktop.

Referring to FIG. 1, the application interface card 10 preferably includes a cover 11 which snaps onto the platform 16. The cover 11 is made from a material suitable for transmitting the wavelength emitted by the LEDs 18, for example, a tinted LEXAN material (LEXAN is a trade mark of General Electric). The cover 11 protects the LED array 18 and photodiodes 20,22 and associated circuitry. As shown in FIG. 1, the cover 11 may include a convex portion 13 which helps direct the deflected beams 30 in the desired directions.

Figure 5:
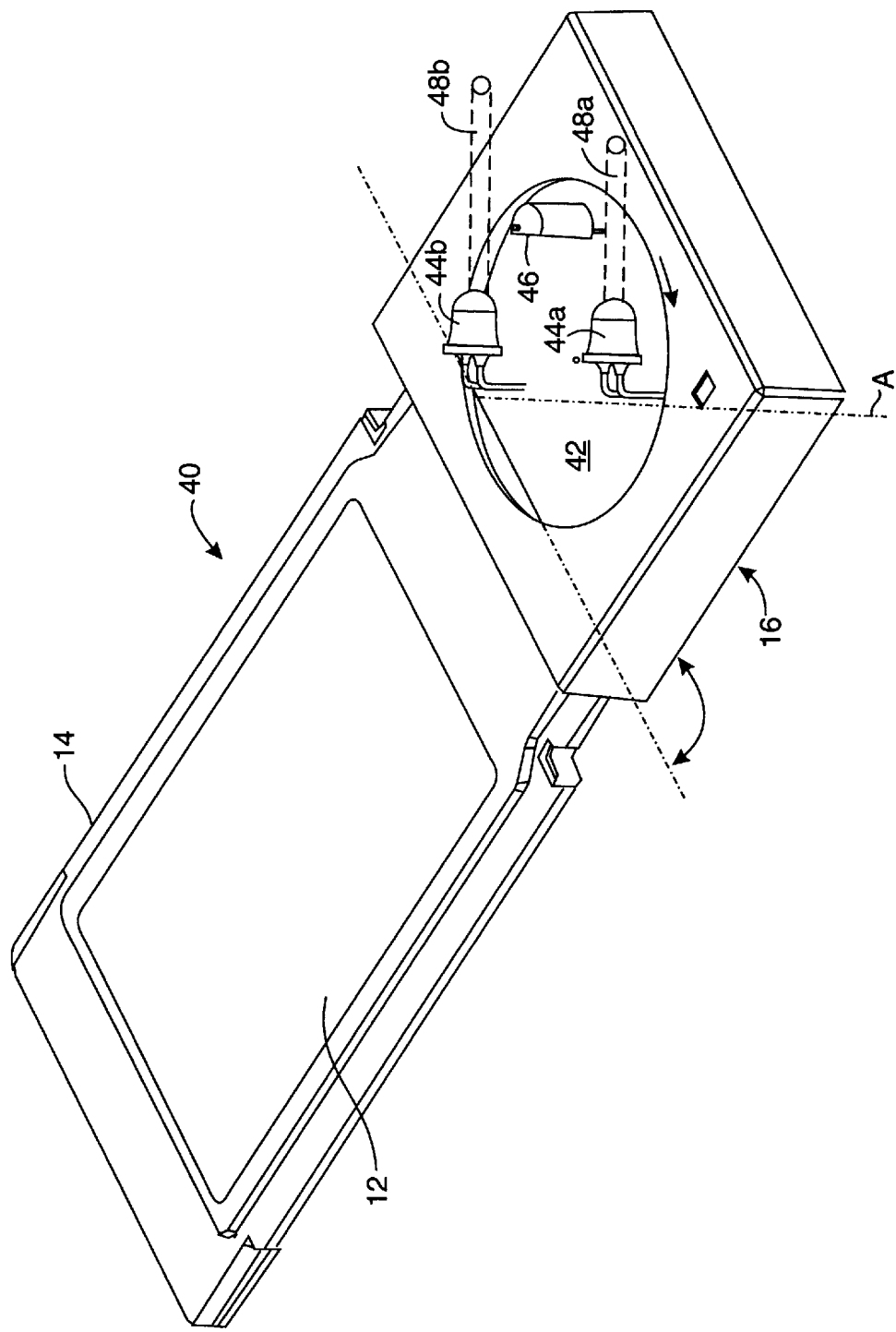
FIG. 5 is a perspective view of an application interface card for an infrared transceiver having a rotatable turret according to a second embodiment of the present invention.

Reference is made to FIG. 5, which shows an application interface card 40 according to another embodiment of the present invention. Like numerals are used to indicated like elements in the figures. The application interface card 40 comprises an arrangement for providing "point-to-point" or "serial IR" communication.

Figure 6:
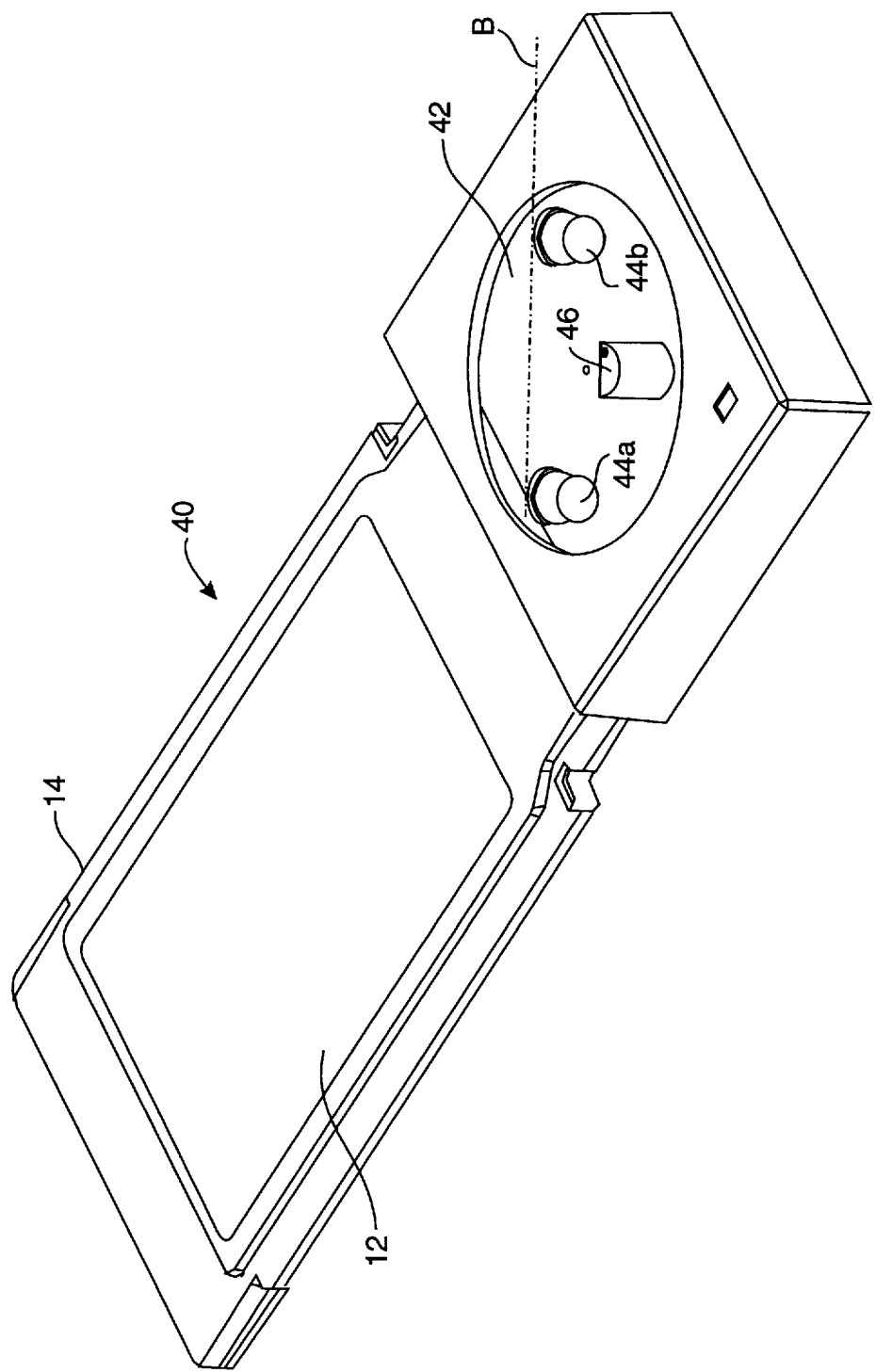
FIG. 6 is a perspective view of the application interface card with the turret rotated 90° from the position shown in FIG. 5.

As shown in FIGS. 5 and 6, the platform 16 comprises a revolving turret 42. Light emitting diodes 44a, 44b and a photodiode 46 are mounted on the surface of the turret 42. The LEDs 44 are mounted to emit beams 48 in the direction of a receiving station (not shown). The turret 42 is rotatable over a range of 0° to 180°.

According to this aspect of the invention, the revolving turret 42 gives the ability to adjust the direction of the beams 48 (serial IR) without the need to move notebook computer 1. As shown illustrated in FIG. 6, the turret 42 (and LEDs 44 and photodiode 46) have been rotated to position B which is 90° from position A shown in FIG. 5.

Figure 7:
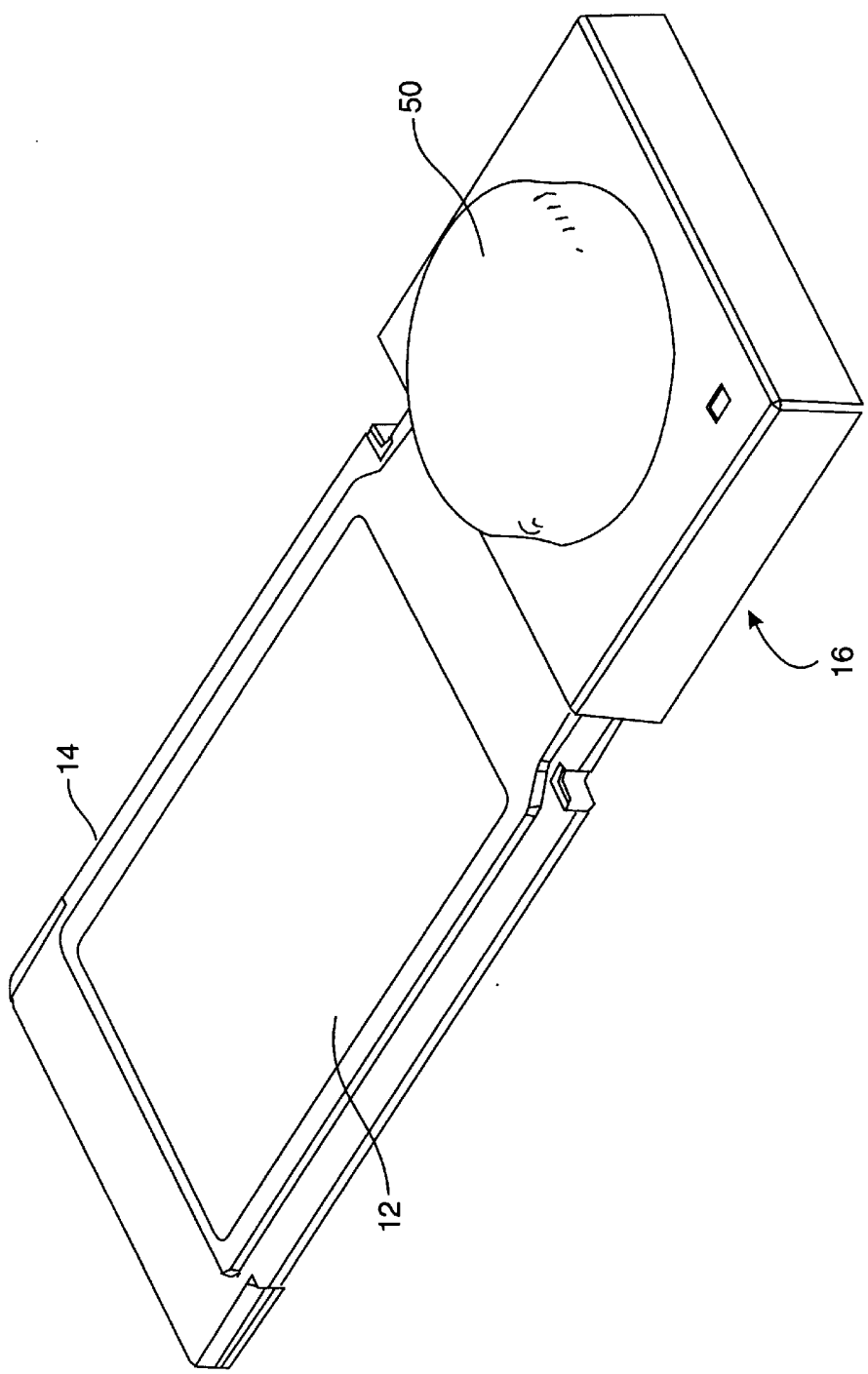
FIG. 7 is a perspective view of the application interface card of FIG. 5 with a cover mounted over the turret.

Referring to FIG. 7, the application interface card 40 preferably includes a cover 50 which fits over the turret 42. The cover 50 serves to protect the LEDs 44, photodiode 46 and associated circuitry. The cover 50 is formed from a material which passes the wavelength of radiation emitted by the LEDs 44 and detected by the photodiode 46. For infrared based systems, a suitable material for the cover 50 is LEXAN (trade mark of General Electric). The cover 50 may be formed to include optical characteristics to enhance the transmission and reception of beams.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An application interface card for providing a wireless communication interface for a computer, said interface card comprising:

a card housing;

a plurality of light emitting diodes and photodiodes located on an extension portion of said card housing;

a circuit for operating said light emitting diodes and said photodiodes, said circuit including an interface for receiving signals from said computer;

a reflector positioned at the emitting end of said light emitting diodes for deflecting beams emitted by said light emitting diodes in controlled directions to produce a predetermined beam dispersal pattern wherein said reflector comprises a plurality of angled surfaces, said angled surfaces being arranged to deflect beams emitted by said light emitting diodes in predetermined directions.

2. The application interface card as claimed in claim 1, wherein said deflected beams form a half hemispherical dispersion pattern.

3. The application interface card as claimed in claim 2, wherein said light emitting diodes are mounted horizontally in a row across the extension portion of said housing.

4. The application interface card as claimed in claim 3, wherein said angled surfaces are formed from chrome plated plastic.

* * * * *